(12) United States Patent
Yuan et al.

(10) Patent No.: US 8,817,808 B2
(45) Date of Patent: *Aug. 26, 2014

(54) MIMO BASED NETWORK CODING NETWORK

(75) Inventors: Jun Yuan, Kanata (CA); Wen Tong, Ottawa (CA); Mo-Han Fong, Ottawa (CA); Jianming Wu, Kanata (CA)

(73) Assignee: Apple Inc., Cupertino, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 13/535,247

(22) Filed: Jun. 27, 2012

(65) Prior Publication Data

US 2012/0263100 A1 Oct. 18, 2012

Related U.S. Application Data

(63) Continuation of application No. 12/199,257, filed on Aug. 27, 2008, now Pat. No. 8,228,835.

(60) Provisional application No. 60/968,206, filed on Aug. 27, 2007, provisional application No. 60/986,682, filed on Nov. 9, 2007.

(51) Int. Cl.
*H04L 12/54* (2013.01)

(52) U.S. Cl.
USPC ........... 370/429; 370/315; 370/319; 370/396; 370/310.2

(58) Field of Classification Search
USPC ................. 370/315, 476, 319, 208, 329, 328, 370/310.2, 396, 429
See application file for complete search history.

(56) References Cited

U.S. PATENT DOCUMENTS 5,930,251 A * 7/1999 Murakami et al. ....... 370/395.65
6,501,733 B1 12/2002 Falco et al.
(Continued)

FOREIGN PATENT DOCUMENTS

JP 2004172669 A 6/2004
JP 2004312542 A 11/2004
(Continued)

OTHER PUBLICATIONS

Hammerstrom et al.; ("MIMO Two-Way Relaying with Transmit CSI at the RElay")' Jun. 2007; IEEE; p. 1-5.*

(Continued)

*Primary Examiner* — Ricky Ngo
*Assistant Examiner* — Dewanda Samuel
(74) *Attorney, Agent, or Firm* — Meyertons, Hood, Kivlin, Kowert & Goetzel, P.C.

(57) ABSTRACT

A wireless communication system includes an intermediate node, a first node and a second node. A method for implementing MIMO based network coding, comprises the first node transmitting first data to the intermediate node, and the second node transmitting second data to the intermediate node. Both the first node and the second node may use spatial multiplexing or time division multiplexing or frequency division multiplexing on a common/different resource. The intermediate node receives the transmissions from the first node and second node, and performs network coding on the first data and second data using a predefined network coding scheme to produce network coded information. The intermediate node transmits the network coded information to the first node and second node using multi-user MIMO and each first or second node receives the MIMO transmissions from the intermediate node and applies network decoding procedures to recover the first data and second data.

20 Claims, 20 Drawing Sheets

(56) References Cited

U.S. PATENT DOCUMENTS

| | | | |
|---|---|---|---|
| 6,603,772 B1 | 8/2003 | Moussavi et al. | |
| 7,020,110 B2 | 3/2006 | Walton et al. | |
| 7,430,168 B2 | 9/2008 | Yamaura et al. | |
| 7,639,639 B2* | 12/2009 | Herdin | 370/315 |
| 7,746,815 B2 | 6/2010 | Can et al. | |
| 7,844,013 B2 | 11/2010 | Hoshino et al. | |
| 7,920,501 B2* | 4/2011 | Larsson et al. | 370/315 |
| 7,983,143 B2 | 7/2011 | Akita et al. | |
| 8,000,650 B2* | 8/2011 | Chang et al. | 455/11.1 |
| 2004/0114618 A1 | 6/2004 | Tong et al. | |
| 2004/0136349 A1 | 7/2004 | Walton et al. | |
| 2004/0192204 A1* | 9/2004 | Periyalwar et al. | 455/25 |
| 2005/0014464 A1 | 1/2005 | Larsson | |
| 2005/0243756 A1 | 11/2005 | Cleveland et al. | |
| 2007/0010196 A1 | 1/2007 | Periyalwar et al. | |
| 2007/0064632 A1 | 3/2007 | Zheng et al. | |
| 2007/0081603 A1 | 4/2007 | Jang et al. | |
| 2007/0149117 A1* | 6/2007 | Hwang et al. | 455/11.1 |
| 2007/0149236 A1 | 6/2007 | Naden et al. | |
| 2007/0160014 A1 | 7/2007 | Larsson | |
| 2007/0184826 A1* | 8/2007 | Park et al. | 455/422.1 |
| 2007/0190934 A1* | 8/2007 | Kim et al. | 455/7 |
| 2008/0032746 A1 | 2/2008 | Olesen et al. | |
| 2008/0064327 A1 | 3/2008 | Choi et al. | |
| 2008/0165720 A1 | 7/2008 | Hu et al. | |
| 2008/0194267 A1* | 8/2008 | Ahn et al. | 455/450 |
| 2009/0221231 A1 | 9/2009 | Weng et al. | |
| 2009/0268662 A1 | 10/2009 | Larsson et al. | |

FOREIGN PATENT DOCUMENTS

| | | |
|---|---|---|
| JP | 2007-214975 | 8/2007 |
| WO | 2006/071187 | 7/2006 |
| WO | 2006071187 | 7/2006 |
| WO | 2007/083219 | 7/2007 |
| WO | 2007083219 | 7/2007 |

OTHER PUBLICATIONS

Office Action in Application No. JP 2010-522145, issued Sep. 25, 2012, pp. 1-2.

Darmawan, et al., "Amplify-and-Forward Scheme in Cooperative Spatial Multiplexing," 16th IST Mobile and Wireless Communications Summit, Jul. 1-5, 2007, pp. 1-5.

Office Action from Japanese Patent Application No. 2013-84316, mailed Feb. 13, 2014, English and Japanese versions, pp. 1-7.

Nidal Nasser.Bader Al-Manthari, Hossam Hassanein, A performance comparison of class-based scheduling algorithms in future UMTS access, Performance, Computing, and Communications Conference, 2005. IPCCC 2005. 24th IEEE International , 2 0 0 5 , pp. 437-441.

Lingfan Weng, Ross D. Murch, Multi-User MIMO Relay System with Self-Interference Cancellation , Wireless Communications and Networking Conference, 2007.WCNC 2007. IEEE, 2007, pp. 959-963.

Andreas Darmawan,Sang W. Kim,Hiroyuki Morikawa, Amplify-and-Forward Scheme in Cooperative Spatial Multiplexing , Mobile and Wireless Communications Summit, 2007.16th IST , 2007 , pp. 1-5.

Extended European Search Report in Application No. 08800242.3, dated Dec. 12, 2013, pp. 1-9.

Lingfan Weng et al, "Multi-User MIMO Relay System with Self-Interference Cancellation", IEEE Wireless Communications and Networking Conference, Mar. 11-15, 2007, pp. 958-962.

Wei Chen et al, "A Cross Layer Method for Interference Cancellation and Network Coding in Wireless Networks", Jun. 1, 2006, pp. 3693-3698.

* cited by examiner

| $b_A$ | $b_B$ | $x_A$ | $x_B$ | $y_{BS}$ | $b_{BS} = b_A \oplus b_B$ | $x_{DF}$ |
|---|---|---|---|---|---|---|
| 0 | 0 | -1 | -1 | -2 | 0 | -1 |
| 1 | 0 | -1 | 0 | 0 | 1 | 1 |
| 0 | 1 | 1 | 0 | 0 | 1 | 1 |
| 1 | 1 | 1 | 2 | 2 | 0 | -1 |

FIG. 4C

| $b_A$ | $b_B$ | $x_A$ | $x_B$ | $y_{BS}$ | $x_{MF}$ |
|---|---|---|---|---|---|
| 0 | 0 | -1 | -1 | -2 | -1 |
| 1 | 0 | 1 | -1 | 0 | 1 |
| 0 | 1 | -1 | 1 | 0 | 1 |
| 1 | 1 | 1 | 1 | 2 | -1 |

FIG. 5C

| $b_A$ | $b_B$ | $x_A$ | $x_B$ | $y_{BS}$ | $x_{AF}$ |
|---|---|---|---|---|---|
| 0 | 0 | -1 | -1 | -2 | -2beta |
| 1 | 0 | 1 | -1 | 0 | 0 |
| 0 | 1 | -1 | 1 | 0 | 0 |
| 1 | 1 | 1 | 1 | 2 | 2beta |

FIG. 6C

☐ =Control Packet *(e.g. Scheduling/ACK/NACK)*
▨ =Data Packet
▩ =Data Packet (HARQ)
B-SCH=BS Control Packet for Resource Scheduling
R-SCH=RS Control Packet for Resource Scheduling

MIMO BASED NETWORK CODING NETWORK

CROSS-REFERENCE TO RELATED APPLICATIONS

This application is a continuation application of U.S. Pat. application Ser. No. 12/199,257, filed on Aug. 27, 2008 now U.S. Pat. No. 8,228,835, which claims the benefit of U.S. provisional patent application Ser. No. 60/968,206, filed on Aug. 27, 2007, and U.S. provisional patent application Ser. No. 60/986,682, filed on Nov. 9, 2007, the entire contents of which are hereby incorporated herein by reference.

FIELD OF THE INVENTION

The present invention relates to wireless communication systems. More specifically, the present invention relates to network coding schemes for wireless communication systems.

BACKGROUND

Network coding increases the capacity or throughput of a wireless network by mixing information received from source nodes at an intermediate node, and retransmitting the mixed information to one or more destination nodes. The content of any information flowing out of the intermediate node can be derived by the destination nodes from the information which flowed into the intermediate node. The combination of network coding and wireless broadcasting can increase unicast throughput of bidirectional traffic using decoding techniques well known in the art.

FIG. 1 illustrates a conventional method (i.e. without network coding) of information exchange between a Base Station (BS) 102 and a Mobile Station (MS) 106 using a Relay Station (RS) 104. At time slot T1, MS 106 forwards packet "a" destined for BS 102. Since BS 102 is out of range, RS 104 intercepts packet "a" and relays it to BS 102 at time slot T2. At time slot T3, BS 102 forwards packet "b" to MS 106 in return, which is also intercepted and relayed via RS 104 at T4. Thus it takes four time slots to complete the information exchange between BS 102 and MS 106.

FIG. 2 illustrates an information exchange between BS 102 and MS 106, but in this scenario RS 104 employs conventional network coding. In this case, the intermediate node (i.e. RS 104) encodes and multicasts the information received from the source nodes (i.e. BS 102 and MS 106). At T1, MS 106 forwards packet "a" to RS 104. At T2, BS 102 forwards packet "b" to RS 104. At T3, RS 104 multicasts a mixture of packets "a+b" (where "+" refers to binary XOR encoding) to both BS 102 and MS 106. Accordingly, it takes three time slots to complete the information exchange. The scenario in FIG. 2 illustrates a Single-Input-Single-Output (SISO) antenna system, a BS-RS-MS scenario and equal time slot scheduling.

Conventional wireless network coding operates at a binary bit-level at the network layer or above with a SISO antenna system. Operating at the network layer or above typically results in complexity in terms of demodulation and decoding.

Known wireless communications schemes may involve the use of a single antenna or multiple antennas on a transmitter and/or receiver. A multiple-input, multiple-output (MIMO) wireless communication system has multiple communication channels that are used between a plurality of antennas at a transmitter and a receiver. Accordingly, in a MIMO system a transmitting device will have N transmit antennas, and a receiving device will have M receive antennas. Space-time coding controls what data is transmitted from each of the N transmit antennas. A space-time encoding function at the transmitter processes data to be transmitted and creates unique information to transmit from the N transmit antennas. Each of the M receive antennas will receive signals transmitted from each of the N transmit antennas. A space-time decoding function at the receiving device will combine the information sent from the N transmit antennas to recover the data.

In systems employing virtual MIMO, multiple mobile stations cooperatively transmit the data of a single mobile station so as to appear as a MIMO transmission. For example, two mobile stations with one antenna each can transmit one of the mobile stations data. A two antenna base station could then receive the two signals and process them using MIMO techniques. Adaptive virtual MIMO refers to a hybrid/combination of pure virtual MIMO and non-virtual MIMO and therefore includes virtual MIMO as a special case. More particularly, adaptive virtual MIMO means virtual MIMO, single input multiple output (SIMO), or a combination of virtual MIMO and SIMO. The advantage of adaptive virtual MIMO is a flexibility to adapt to different user channel conditions.

SUMMARY OF THE INVENTION

In one embodiment, the system and method described herein employs adaptive virtual MIMO for unicast transmissions, MIMO based network encoding, and multiuser MIMO for multicast transmissions. Adaptive virtual MIMO refers to one or multiple mobile stations transmitting at one or multiple resource units.

In some embodiments, the network encoding scheme employed is one of Decode and Forward (DF), Map and Forward (MF) and Amplify and Forward (AF).

In some embodiments, multiuser MIMO multicast transmissions use one of space-time block code (STC) and beamforming.

In some embodiments, MIMO based network encoding is performed at a lower physical layer using one of MF and AF encoding schemes.

In some embodiments, a simplified scheduler is employed for more flexible and simpler resource allocation.

In some embodiments, more application scenarios can be accommodated than those illustrated in FIGS. 1 and 2 (i.e. BS-RS-MS). Some of these scenarios include MS-BS-MS, RS-BS-RS, MS-BS-RS, BS-RS-RS, BS-RS-MS, BS-MS-MS, and RS-MS-MS. When MSs are near each other, they can form a group, and this will be treated as an MS Group (MSG). Some of these scenarios include MSG-BS-MSG, MSG-BS-RS, BS-RS-MSG, BS-MSG-MSG, and RS-MSG-MSG.

In some embodiments, an intermediate station such as a RS receives adaptive virtual MIMO transmissions, applies MIMO based network coding to the received information, and transmits an encoded Hybrid Automatic Repeat Request (HARQ) message via uplink to a serving station.

In one broad aspect, there is provided in a wireless communication system including an intermediate node, a first node and a second node, the intermediate node including a plurality of antennas, a method for implementing MIMO based network coding comprising: the first node transmitting first data to the intermediate node, and the second node transmitting second data to the intermediate node; the intermediate node receiving the transmissions from both first node and second node, and performing network coding on the first data and second data using a predefined network coding scheme to produce network coded information; the intermediate node transmitting the network coded information to the first node and second node using multi-user MIMO; and; both first node and second node receiving the MIMO transmission and applying network decoding to recover the first data and second data.

The first peer node may belong to a group of peer nodes all within a same coverage area. The second peer node may belong to a group of peer node all within a same coverage area.

In another broad aspect, there is provided a transceiver in a wireless communications network for implementing MIMO based network coding, comprising: a plurality of antennas; circuitry operable to receive first data from a first node, and second data from a second node; perform network coding on the first data and second data using a predefined network coding scheme to produce network coded information; and transmit the network coded information to the first node and second node using multi-user MIMO.

Other aspects and features of the system and method described herein will become apparent to those ordinarily skilled in the art, upon review of the following description of the specific embodiments of the invention.

BRIEF DESCRIPTION OF THE DRAWINGS

The invention will now be described in greater detail with reference to the accompanying diagrams, in which:

FIG. 4C is a table indicating the values of the various variables as they pass through the various processing stages of the embodiment of FIG. 4A;

FIG. 5C is a table indicating the values of the various variables as they pass through the various processing stages of the embodiment of FIG. 5A;

FIG. 6C is a table indicating the values of the various variables as they pass through the various processing stages of the embodiment of FIG. 6A;

DETAILED DESCRIPTION OF THE PREFERRED EMBODIMENTS

In one embodiment, MIMO based network coding includes:

a. two peer nodes (or groups) transmitting information to an intermediate network encoding node (such as a transceiver) using the same or a different radio resource (e.g., bandwidth, time-slot). The information could be transmitted using one or more of spatial multiplexing, time division multiplexing, and frequency division multiplexing. In one embodiment the information is transmitted using adaptive virtual MIMO. Here each peer node group contains one or multiple peer nodes that are nearby. In the following text, peer node refers to peer node group.

b. the intermediate network encoding node receiving the transmissions, applying network coding to the received information, and transmitting the network encoded information as multi-user MIMO. In one embodiment, the MIMO transmission is a spatial multiplexing transmission; and c. each peer node (or group) receiving the MIMO streams and applying applicable network decoding procedures to recover the information.

Figure 1:
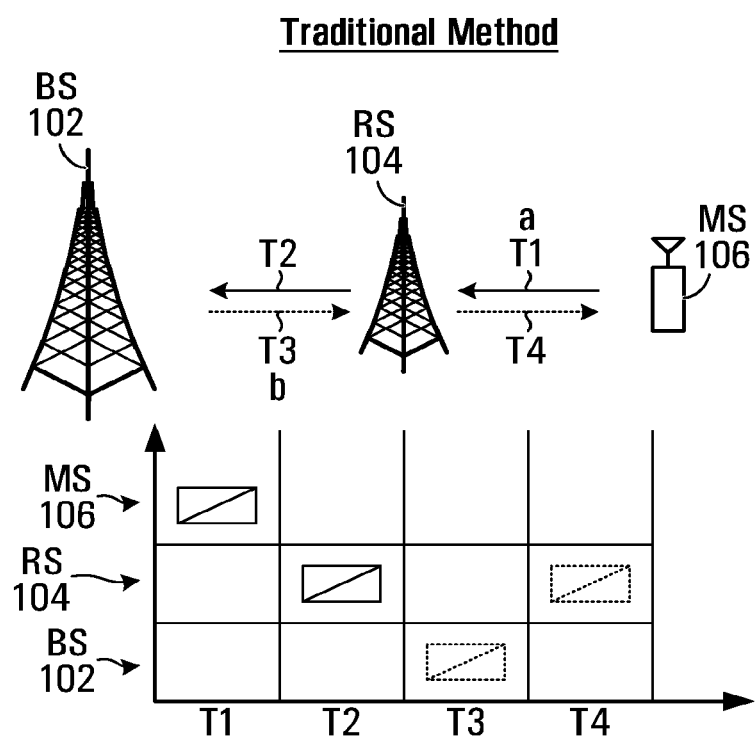
FIG. 1 illustrates a conventional method of information exchange between a BS, a MS and a RS without network coding.
Figure 2:
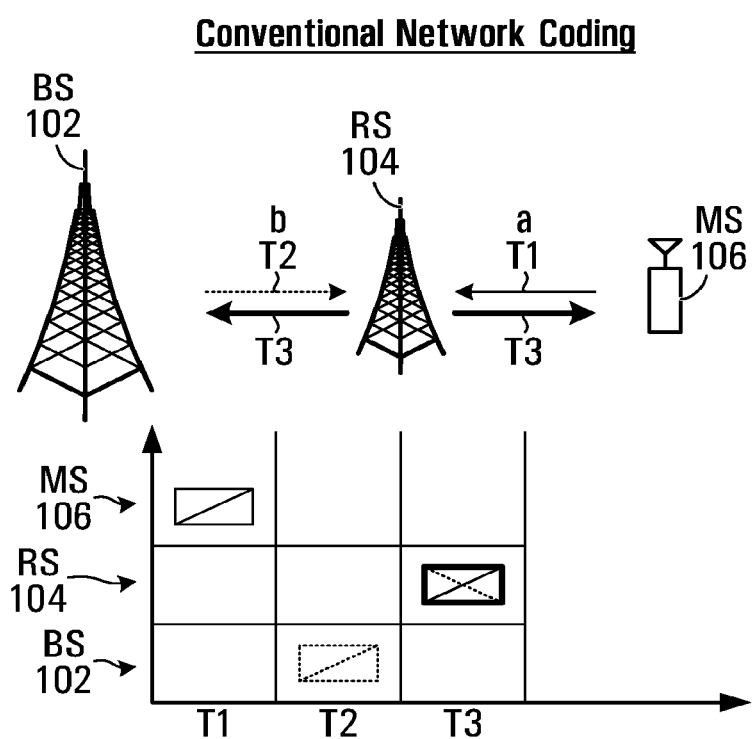
FIG. 2 illustrates a method of information exchange between a BS, a MS and a RS employing conventional network coding.
Figure 3:
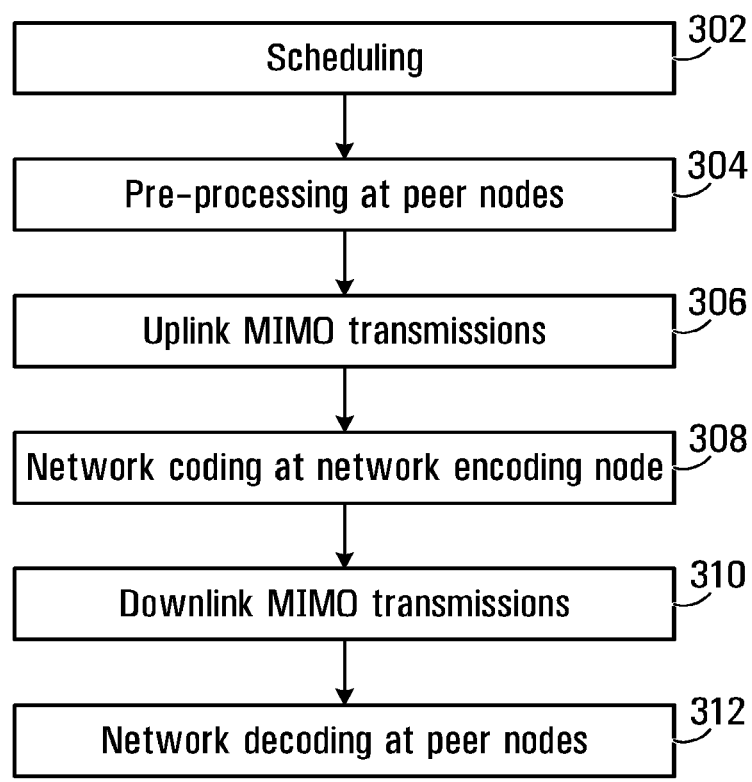
FIG. 3 is a flowchart of steps in one embodiment of MIMO based network coding.

FIG. 3 is a flowchart of steps in one embodiment of MIMO based network coding. FIG. 3 is intended to provide a high level summary of the various steps which may be involved in connection with each of the various embodiments described herein.

Figure 4A:
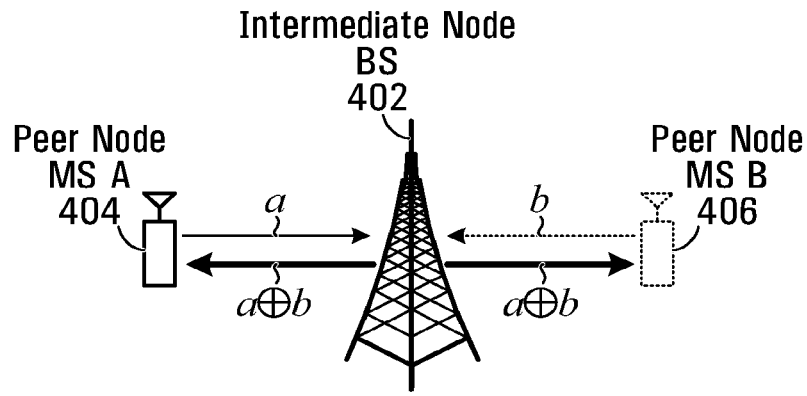
FIG. 4A is a schematic diagram of a wireless communications environment according to one embodiment involving the use of a DF network coding scheme.

FIG. 4A is a schematic diagram of a wireless communications environment according to one embodiment involving the use of a DF network coding scheme.

For ease of understanding, the various high-level steps of FIG. 3 will be described in conjunction with the embodiment illustrated in FIG. 4A, though some or all of the steps of FIG. 3 are applicable to the other embodiments described and illustrated herein.

The general architecture framework of MIMO based network coding, as illustrated in FIG. 3, allows for the performance of different levels of network coding, including network coding at the binary bit level, finite field arithmetic level, modulation symbol level, and signaling waveform level. Various MIMO technologies can be employed, including adaptive virtual MIMO, STC and beamforming. The architecture is also suitable for different air-interfaces including Orthogonal Frequency Division Multiplexing (OFDM), Time Division Multiple Access (TDMA), and Code Division Multiple Access (CDMA).

Scheduling step 302 relates to the scheduling and queuing of packets at intermediate network encoding nodes, such as BS 402 shown in FIG. 4A. Scheduling step 302 is performed by a scheduler which can contribute to maximizing the gain from the use of MIMO based network coding. Scheduling step 302 will be described in more detail in conjunction with one embodiment of the scheduler illustrated in FIG. 10 below.

At step 304, pre-processing is performed at peer nodes 404, 406. Further details concerning the pre-processing step will be provided in connection with FIG. 7.

At step 306, virtual MIMO can be used to uplink packet "a" from MS A 404 to BS 402. Virtual MIMO can also used to uplink packet "b" from MS B 406 to BS 402. With virtual MIMO uplink, both peer nodes can transmit to the intermediate network encoding node using the same resource unit.

Not shown in FIG. 3 is a demodulation step (for DF and MF) and a decoding (for DF) step performed at BS 402, which decodes the received information using Minimum Mean Square Error (MMSE) (or MMSE-soft interference calculation (MMSE-SIC) or Zero Forcing) detection techniques.

At step 308, network coding is performed at the network encoding node, which in FIG. 4 is BS 402. In this embodiment, network coding comprises a binary (or finite field arithmetic) linear combination.

At step 310, BS 402 multicasts a+b to both MS A 404 and MS B 406 simultaneously via downlink MIMO transmissions (e.g., STC or beamforming).

Figure 4B:
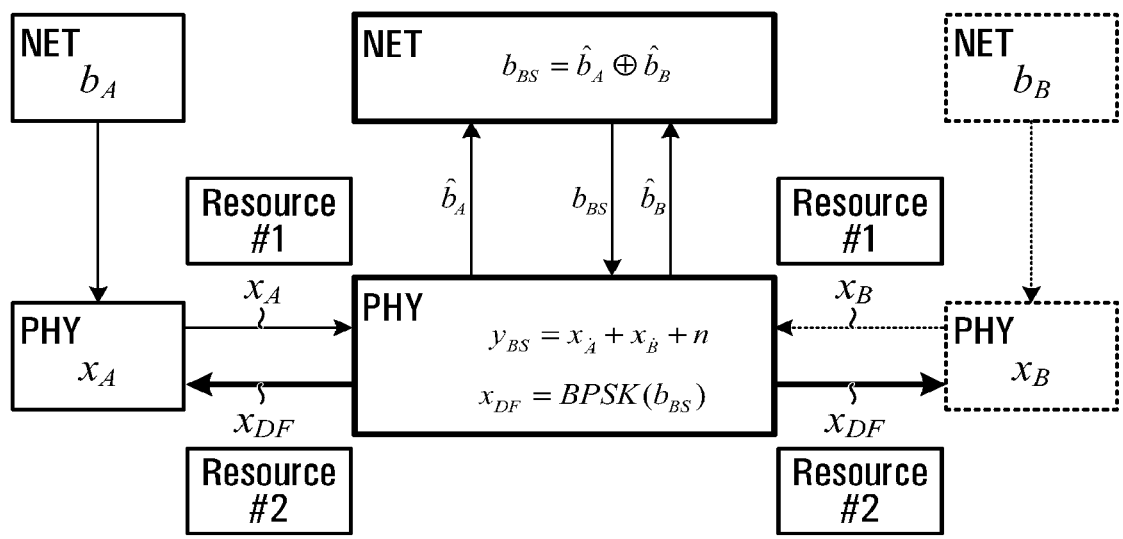
FIG. 4B is a schematic diagram illustrating the processing of bits between the network layer and the physical layer using the DF network coding scheme illustrated in FIG. 4A.

FIG. 4B is a schematic diagram illustrating the processing of bits between the network layer and the physical layer using the DF network coding scheme illustrated in FIG. 4A. FIG. 4C is a table indicating the values of the various variables as they pass through the various processing stages of this embodiment.

An explanation of FIGS. 4B and 4C follows. Take for example row 1 in the table of FIG. 4C. At the network layer, MS A 404 generates information bit $b_A=0$. MS B 406 generates information bit $b_B=0$.

Both MS A 404 and MS B 406 pass the information bits from the network layer to the physical layer, transfer the information into a proper modulation symbol, and transmit to BS 402 via resource unit #1. For Binary Phase Shift Keying (BPSK) modulation, information bit 0 is mapped to modulation symbol −1, therefore $x_A=-1$, $x_B=-1$.

BS 402 receives the sum of the two symbols from both MS A 404 and MS B 406. Assuming noise is negligible, the received symbol becomes $y_{BS}=-2$. BS 402 employs a MIMO demodulator and Forward Error Control (FEC) decoder to estimate the information bits, i.e., $\hat{b}_A$ and $\hat{b}_B$, and passes them up to the network layer. At the network layer, BS 402 conducts information mixing, e.g., XOR operation, to obtain network encoded bit $b_{BS}=0$. BS passes down $b_{BS}$ to the physical layer, uses proper modulation, i.e., $X_{DF}=-1$, and multicasts to both MS A 404 and MS B 406 via resource unit #2.

A similar analysis can be performed in connection with rows 2, 3 and 4 of the table in FIG. 4C. In row 2, MS A 404 generates information bit $b_A=1$ and MS B 406 generates information bit $b_B=0$. In row 3, MS A 404 generates information bit $b_A=0$ and MS B 406 generates information bit $b_B=1$. In row 4, MS A 404 generates information bit $b_A=1$ and MS B 406 generates information bit $b_B=1$.

Further details concerning steps 308 and 310 will be provided in conjunction with FIG. 8 described below.

At step 312, MS A 404 and MS B 406 first decode the network coded packet, and then extract the desired information through a linear operation (e.g. XOR) with its own transmitted information, i.e. MS A 404 uses its knowledge of packet "a" to decode the transmission from BS 402 and calculate packet "b". Likewise, MS B 406 uses its knowledge of packet "b" to decode the transmission from BS 402 to calculate packet "a".

The advantage of the scenario illustrated in FIG. 4A is that only one resource unit in uplink via virtual MIMO is used and only one resource unit in downlink via network coding is used.

Figure 5A:
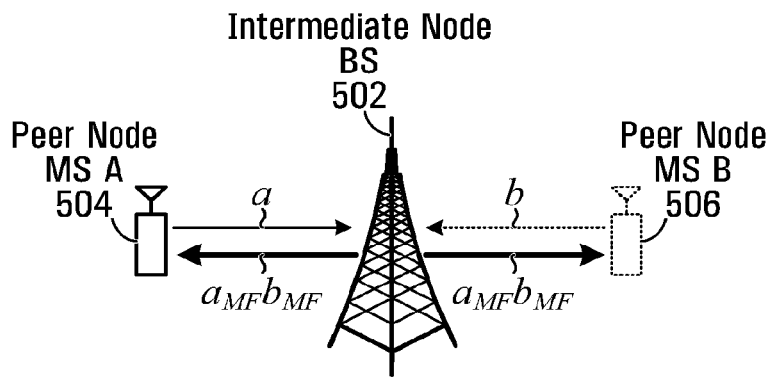
FIG. 5A is a schematic diagram of a wireless communications environment according to one embodiment involving the use of a MF network coding scheme.

FIG. 5A is a schematic diagram of a wireless communications environment according to one embodiment involving the use of a MF network coding scheme.

Turning once again to FIG. 3, at step 304, pre-processing is performed at peer nodes 504, 506. In this case, both peer nodes perform predistortion (e.g. phase rotation and power control) and use the same Modulation and Coding Scheme (MCS).

At step 306, virtual MIMO can be used to uplink packet "a" from MS A 504 to BS 502. Virtual MIMO can also used to uplink packet "b" from MS B 506 to BS 502. This step can be performed simultaneously, i.e. the same resource unit is used.

Figure 5B:
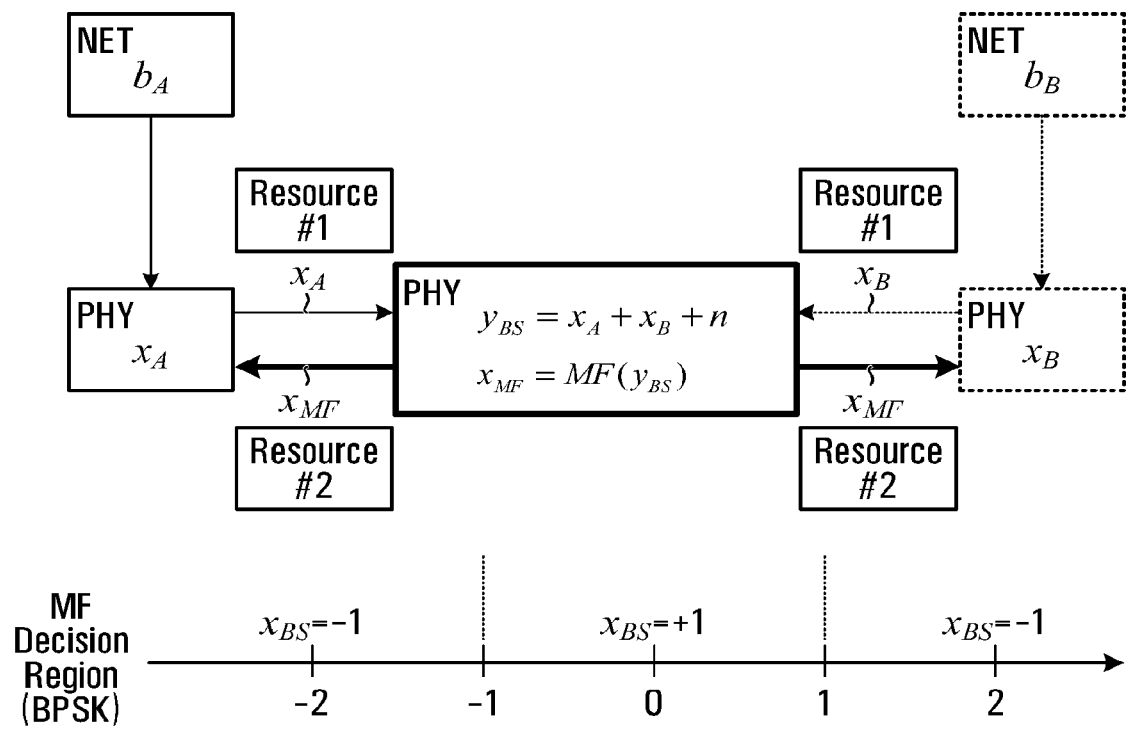
FIG. 5B is a schematic diagram illustrating the processing of bits between the network layer and the physical layer using the MF network coding scheme illustrated in FIG. 5A.

At step 308, network coding is performed at BS 502. In this embodiment, BS 502 maps incoming symbols "a" and "b" into a valid symbol-level constellation according to the decision region. This is illustrated in FIG. 5B.

At step 310, BS 502 uses downlink MIMO transmission to multicast $a_{MF}b_{MF}$ to both MS A 504 and MS B 506 simultaneously using, for example, STC or beamforming.

At step 312, MS A 504 and MS B 506 first decode the network coded packet, and then extract the desired information through a linear operation (e.g. XOR) with its own transmitted information, i.e. MS A 504 uses its knowledge of packet "a" to decode the transmission from BS 502 and calculate packet "b". Likewise, MS B 506 uses its knowledge of packet "b" to decode the transmission from BS 502 to calculate packet "a".

The advantage of the scenario illustrated in FIG. 5A is that only one resource unit in uplink via virtual MIMO is used, and only one resource unit in downlink via network coding is used. As well, there is no decoding process required at the intermediate nodes.

FIG. 5B is a schematic diagram illustrating the processing of bits between the network layer and the physical layer using the MF network coding scheme illustrated in FIG. 5A. FIG. 5C is a table indicating the values of the various variables as they pass through the various processing stages of this embodiment.

An explanation of FIGS. 5B and 5C follows. Take for example row 2 in the table shown in FIG. 5C. At the network layer, MS A 504 generates information bit $b_A=1$. MS B 506 generates information bit $b_B=0$.

Both MS A 504 and MS B 506 pass the information bits from the network layer to the physical layer, transfer the information into a proper modulation symbol, and transmit to BS 502 via resource unit #1. For BPSK modulation, information bit 1 is mapped to symbol $x_A=1$. And information bit 0 is mapped to symbol $x_B=-1$.

BS 502 receives the sum of the two symbols from both MS A 504 and MS B 506. Assuming noise is negligible, the received symbol becomes $y_{BS}=0$.

BS 502 employs a MIMO demodulator (without FEC decoder) and maps the received signal into a valid modulation symbol $x_{MF}$ at the physical layer. An example of mapping rule (or called MF decision region for BPSK) is illustrated in the bottom of FIG. 5B. Here, since $y_{BS}=0$, it is mapped to symbol $x_{MF}=+1$. Consequently $x_{MF}$ is a physical-layer network encoded modulation symbol. Next BS 502 multicasts $x_{MF}$ to both MS A 504 and MS B 506 via resource unit #2.

A similar analysis can be performed in connection with rows 1, 3 and 4 of the table in FIG. 5C.

Figure 6A:
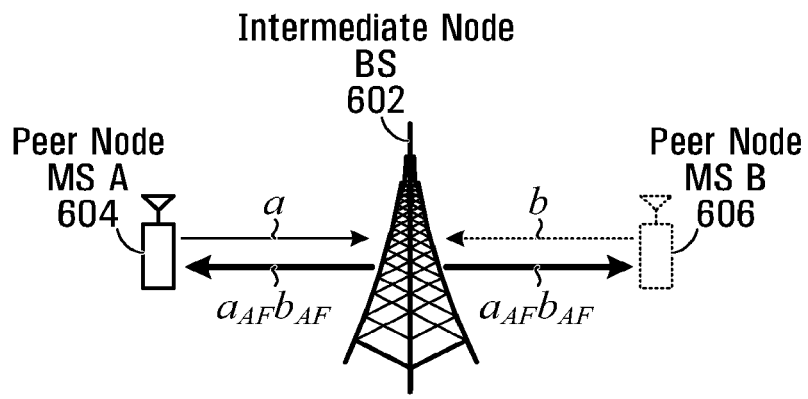
FIG. 6A is a schematic diagram of a wireless communications environment according to one embodiment involving the use of an AF network coding scheme.

FIG. 6A is a schematic diagram of a wireless communications environment according to one embodiment involving the use of an AF network coding scheme.

Turning once again to FIG. 3, at step 304, pre-processing is performed at peer nodes 604, 606.

At step 306, virtual MIMO can be used to uplink packet "a" from MS A 604 to BS 602. Virtual MIMO can also used to uplink packet "b" from MS B 606 to BS 602. This step can be performed simultaneously, i.e. the same resource unit is used.

Figure 6B:
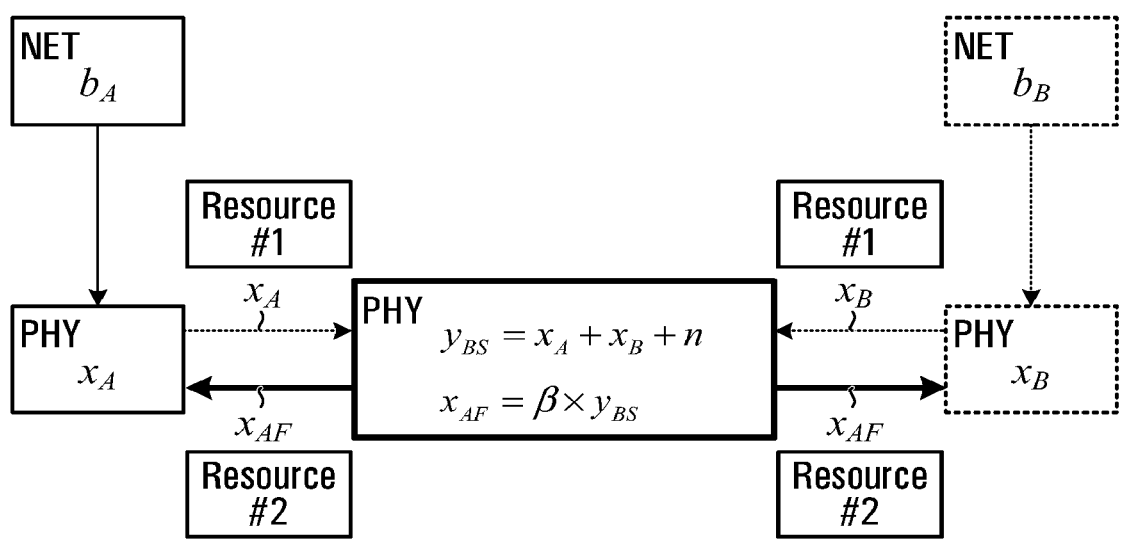
FIG. 6B is a schematic diagram illustrating the processing of bits between the network layer and the physical layer using the AF network coding scheme illustrated in FIG. 6A.

At step 308, network coding is performed at BS 602. In this embodiment, BS 602 amplifies the incoming MIMO signals (waveform level). This is illustrated in FIG. 6B.

At step 310, BS 602 uses downlink MIMO transmission to multicast $a_{AF}b_{AF}$ to both MS A 604 and MS B 606 simultaneously using, for example, STC or beamforming.

At step 312, each of MS A 604 and MS B 606 first subtracts its own information, and then decodes the subtracted packet to obtain the desired information, i.e. MS A 604 uses its knowledge of packet a to decode the transmission from BS 602 and calculate packet "b". Likewise, MS B 606 uses its knowledge of packet b to decode the transmission from BS 602 to calculate packet "a".

The advantage of the scenario illustrated in FIG. 6A is that only one resource unit in uplink via virtual MIMO is used and only one resource unit in downlink via network coding is used. As well, there is no decoding process required at the peer nodes, and no demodulation process.

FIG. 6B is a schematic diagram illustrating the processing of bits between the network layer and the physical layer using the AF network coding scheme illustrated in FIG. 6A. FIG. 6C is a table indicating the values of the various variables as they pass through the various processing stages of this embodiment.

An explanation of FIGS. 6B and 6C follows. Take for example the last row in the table shown in FIG. 6C. At the network layer, MS A 504 generates information bit $b_A=1$. MS B 506 generates information bit $b_B=1$.

Both MS A 604 and MS B 606 pass the information bits from the network layer to the physical layer, transfer the information into proper modulation symbol, and transmit to BS 602 via resource unit #1. For BPSK modulation, information bit 1 is mapped to symbol 1; hence $x_A=1$ and $x_B=1$.

BS 602 receives the sum of the two symbols from both MS A 604 and MS B 606. Assuming noise is negligible, the received symbol becomes $y_{BS}=2$.

BS 602 multiplies the received signal $y_{BS}$ by a factor of beta, and obtains signal $x_{AF}$. Note, there is no need for a MIMO demodulator and a FEC decoder.

Next, BS 602 multicasts $x_{AF}$ to both MS A 604 and MS B 606 via resource unit #2.

A similar analysis can be performed in connection with rows 1, 2 and 3 of the table in FIG. 6C.

FIGS. 4A, 4B, 4C, 5A, 5B, 5C, 6A, 6B, and 6C each provide a specific example of a communication system or elements of a communication system that could be used to implement embodiments of the invention. It is to be understood that embodiments of the invention can be implemented with communications systems having architectures that are different than the specific examples described herein, but that operate in a manner consistent with the implementation of the embodiments as described herein.

For example, the network encoding node can be a RS node or a BS node, or a MS node, and the network decoding node can be a MS node, a RS node, or a BS node. The network coding configurations can be MS-BS-MS, MS-RS-MS, MS-BS-RS, RS-BS-RS, BS-RS-RS, BS-MS-MS, RS-MS-MS, MSG-BS-MSG (MS group), MSG-RS-MSG, BS-MSG-MSG, RS-MSG-MSG, and MSG-BS-RS. The network paths can be constituted by the individual or combination of basic configurations of network coding configurations mentioned above. The network can be configured by individual or combination of basic configurations of the network coding configurations and/or network paths mentioned above. The network can utilize a Point to Multipoint (PMP) or mesh topology.

Figure 7:
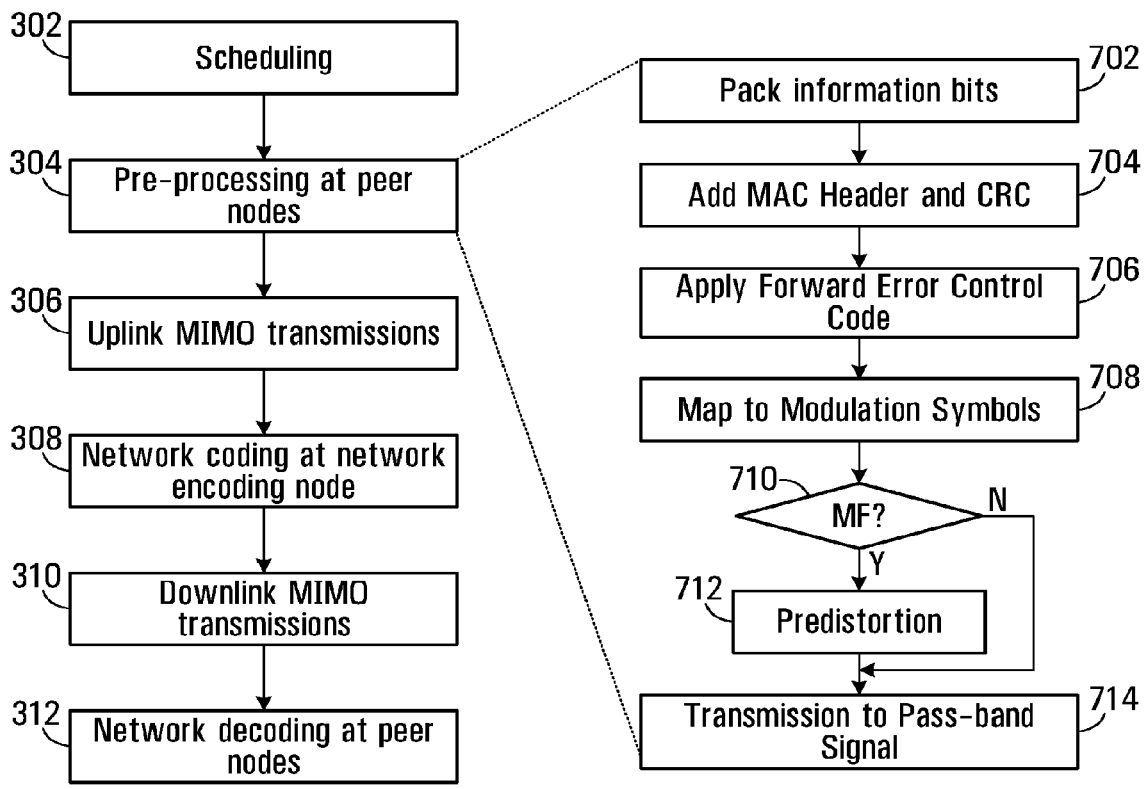
FIG. 7 is a flowchart of a MIMO based network coding architecture with additional detail concerning the pre-processing step of FIG. 3.

FIG. 7 is a flowchart of a MIMO based network coding architecture with additional detail concerning the pre-processing step. Steps 302, 306, 308, 310 and 312 are carried out in the same manner as discussed above in connection with FIG. 3. In FIG. 7, further detail is only provided in respect of pre-processing step 304.

In one embodiment, pre-processing of information bits is carried out as follows. At step 702, the information bits are packed, and at step 704 the Medium Access Control (MAC) header and Cyclic Redundancy Check (CRC) are added. At step 706, forward error control code (e.g., convolution code, Turbo code, Low Density Parity-Check Code (LDDC)) is applied. At step 708, the resulting information is mapped to modulation symbols (e.g., Quadrature Phase Shift Keying (QPSK), 16 Quadrature Amplitude Modulation (QAM), 64QAM). At step 710, it is determined whether a MF network coding scheme is to be employed. If yes, apply predistortion (e.g., constellation rotation and/or power control) and proceed to step 714, otherwise proceed directly to step 714 where the base-band modulation symbols are transformed to passband waveform signals. Then proceed to the uplink adaptive virtual MIMO transmissions step 306 described above in connection with FIG. 3.

Figure 8:
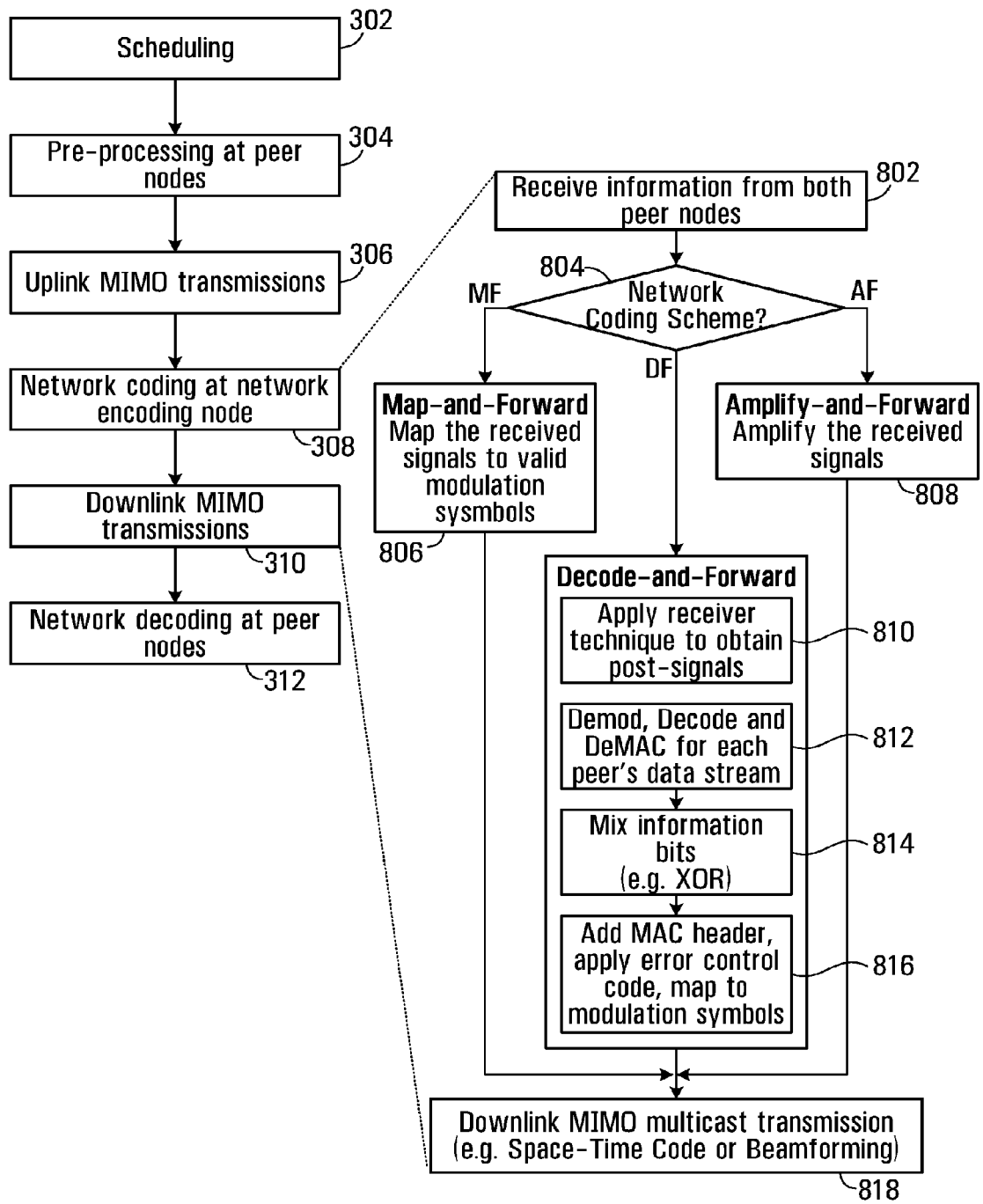
FIG. 8 is a flowchart of a MIMO based network coding architecture with additional detail concerning the network coding and downlink steps of FIG. 3.

FIG. 8 is a flowchart of a MIMO based network coding architecture with additional detail concerning the network coding and downlink steps. Steps 302, 304, 306, and 312 are carried out in the same manner as discussed above in connection with FIG. 3. In FIG. 8, further detail is only provided in respect of the network coding step 308 and the downlink step 310.

At step 802, the intermediate node receives the information/signals from both peer nodes. At step 804, a check is performed of which network coding scheme is being used. If the network coding scheme is MF, proceed to step 806. If the network coding scheme is AF, proceed to step 808. If the network coding scheme is DF, proceed to step 810.

At step 806 (i.e. the network coding scheme is MF), map the received signals to valid modulation symbols according to a predetermined decision-region, which depends on the predistortion process at step 712. Proceed to step 818.

At step 808 (i.e. the network coding scheme is AF), Amplify the received signals and proceed to step 818.

At step 810 (i.e. the network coding scheme is DF), apply one of the receiver techniques (e.g., Zend Framework (ZF), MMSE, MMSE-SIC) to obtain post-processed signals. At step 812, for each peer node's data stream, conduct demodulation, decoding, de-MAC to obtain the information bits. At step 814, network encode the information bits from both peer nodes by XOR (or other finite field arithmetic) operation. If the packet sizes from both peers are different, simply pad zeros for the shorter packet before network encoding. At step 816, add MAC header, apply FEC code, and apply modulation constellation. Proceed to step 818.

At step 818, transform the base-band signals to pass-band signals, and multicast the signals from the network encoding node to both peer nodes via downlink MIMO transmissions (e.g., STC or beamforming). Then proceed to network decoding step 312 which is described above in connection with FIG. 3. More detail concerning the network decoding step is provided in connection with FIG. 9 below.

Figure 9:
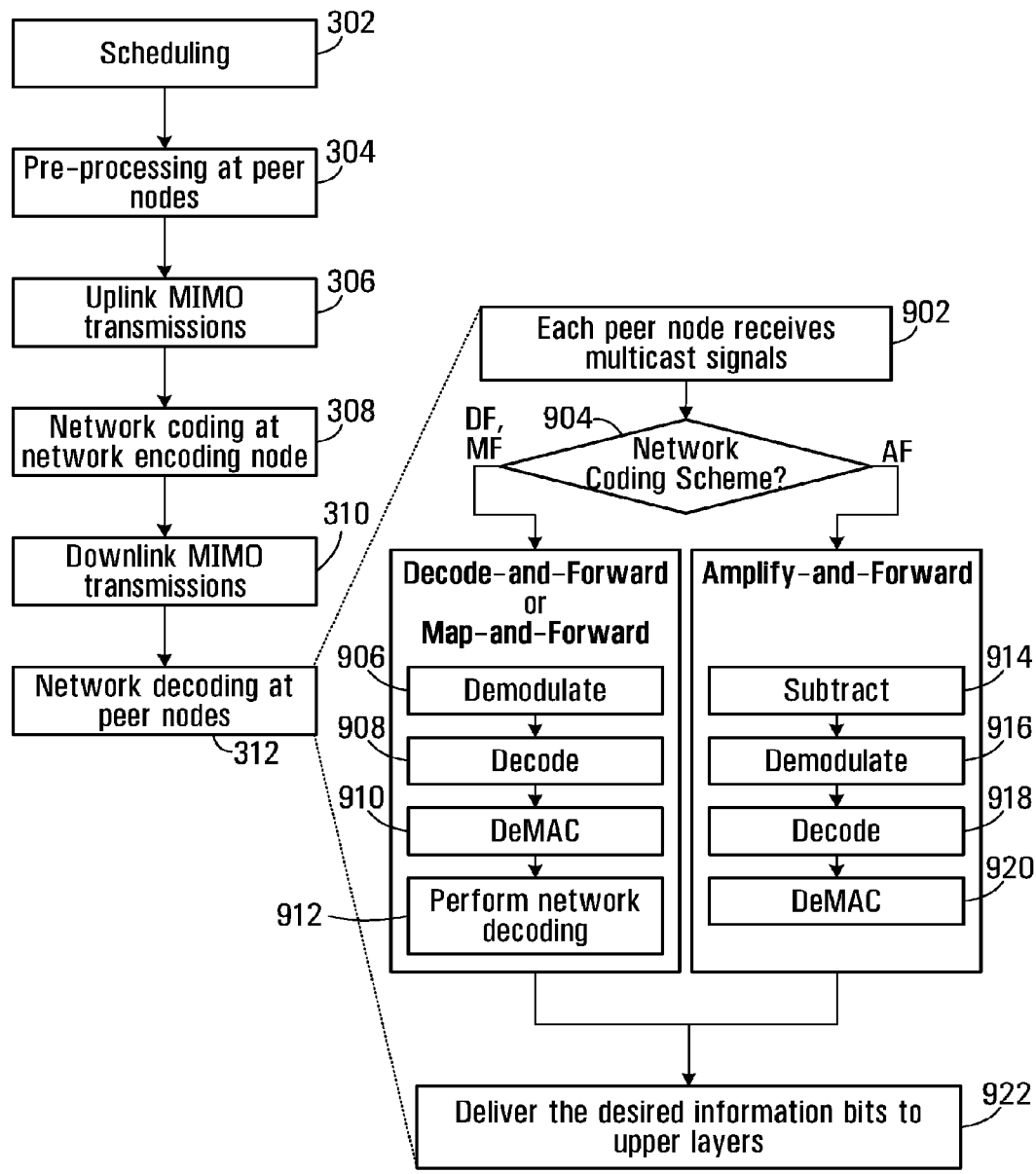
FIG. 9 is a flowchart of a MIMO based network coding architecture with additional detail concerning the network decoding step of FIG. 3.

FIG. 9 is a flowchart of a MIMO based network coding architecture with additional detail concerning the network decoding step. Steps 302, 304, 306, 308 and 310 are carried out in the same manner as discussed above in connection with FIG. 3. In FIG. 9, further detail is only provided in respect of network decoding step 312.

At step 902, each peer node receives the multicast signals. At step 904, a check is performed of which network coding scheme is being used. If the network coding scheme is MF or DF, proceed to step 906. If the network coding scheme is AF, proceed to step 914.

At step 906 (i.e. the network coding scheme is DF or AF), demodulate the signals into valid modulation symbols. At step 908, apply FEC code decoding process. At step 910, de-MAC header (and check CRC) to obtain (network coded) information bits. At step 912, perform network decoding by mixing the received (network coded) information bits with the transmitted information bits via XOR (or other finite-field arithmetic) operation, and hence obtain the desired information bits. A joint process of demodulation 906, decode 908, network decoding 912, and deMAC 910 can also be conducted in an iterative manner. Proceed to step 922.

At step 914 (i.e. the network coding scheme is AF), subtract the transmitted information signals from the received multicast signals. At step 916, demodulate the subtracted signals into valid modulation symbols. At step 918, apply forward error control code decoding process. At step 920, de-MAC header (and check CRC) to obtain desired information bits. Proceed to step 922.

At step 922, deliver the desired information bits to upper layers.

Figure 10:
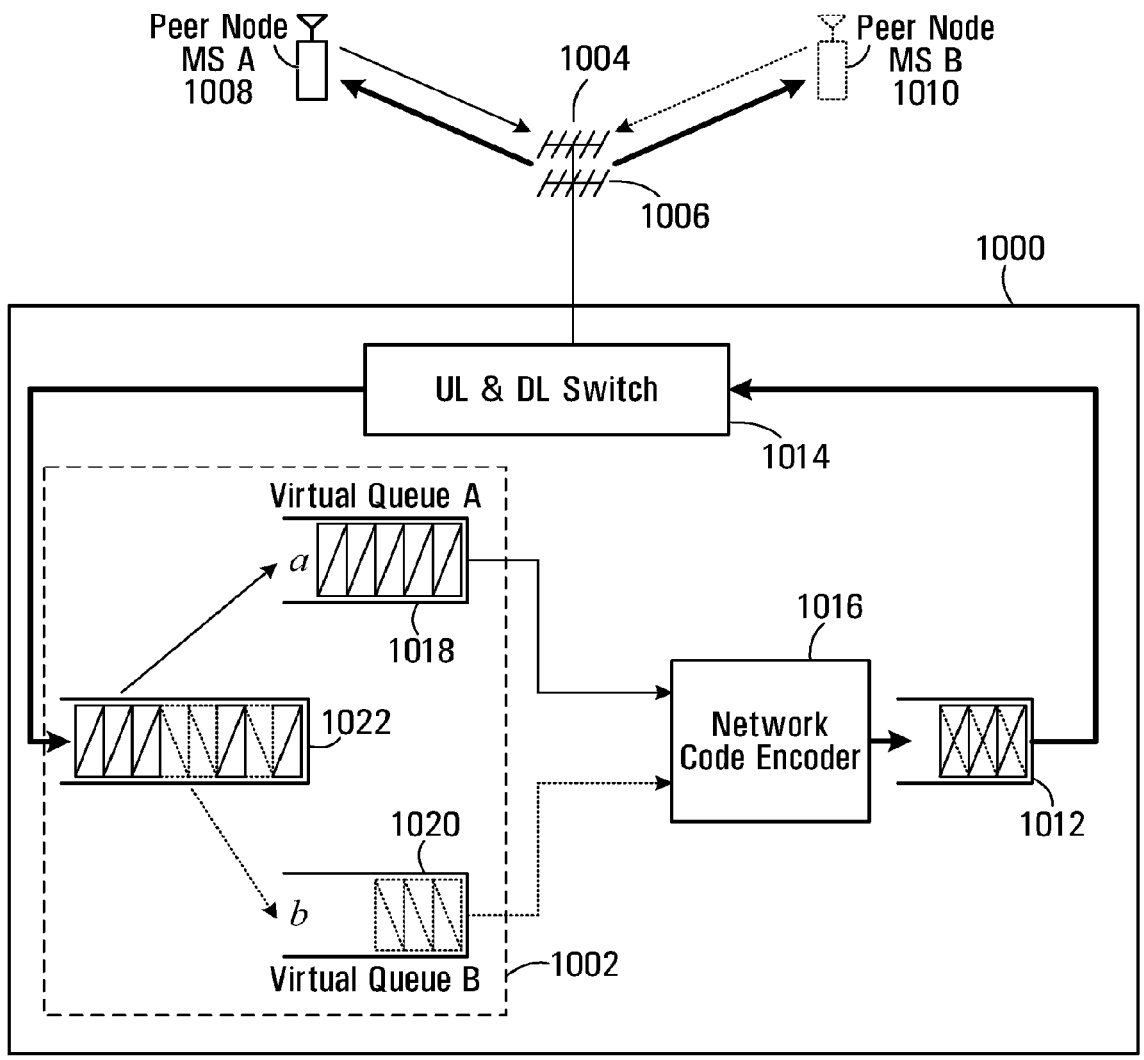
FIG. 10 is a schematic diagram of a scheduler used with some embodiments of the invention.

FIG. 10 is a schematic diagram of a scheduler used in connection with some embodiments of the invention.

Shown is BS 1000 having a set of antennas 1004, 1006. BS 1000 is shown in wireless communication with MS A 1008 and MS B 1010. Note that BS 1000 can be connected to any network or portion of a network from which/over which packets 1012 are delivered to/from base station 1000. Also shown is UL and DL switch 1014 which is used to transport packets to (in the downlink direction) and from (in the uplink direction) BS 1000.

Also shown is network code encoder 1016 for DF, used to encode packets received from either virtual queue A 1018 (i.e. queue of packets from MS A 1008) or virtual queue B 1020 (i.e. the queue of packets from MS B 1008). After encoding, packets 1012 are transported to UL and DL switch 1014 for transmitting to MS 1008 and MS B 1010 in the manner described above.

BS 1000 also includes a MIMO-based network coding scheduler 1002. MIMO-based network coding scheduler 1002 selects packets for transmission among the packets in either virtual queue A 1018 or virtual queue B 1020. MIMO-based network coding scheduler 1002 is used to increase network coding gain that would otherwise not be realized.

MIMO based network coding scheduler 1002 arranges for a flexible resource allocation for uplink and downlink. For uplink, there is an allocation of both peers at the same (or different) resource unit. Here resource unit is defined as follows: (i) time-frequency sub-channels for OFDM, (ii) time slots for TDMA; and (iii) orthogonal codes for CDMA. For downlink, there is an allocation of resources for network encoding node to multicast, using STC and beamforming. Practical factors such as queue length and fairness are taken into account.

In operation, packets from MS A 1008 (shown in full lined outline) will arrive at BS 1000 via the UL & DL Switch 1014. Packets from MS B 1010 (shown in dotted outline) will also arrive in the same manner. In both cases, the packets will be transported by UL & DL Switch 1014 to MIMO-based network coding scheduler 1002 where they will enter initial virtual queue 1022 in the order in which they are received. The packets will then be transported from initial virtual queue 1022 to virtual queue A 1028 or virtual queue B, depending on whether the packets originated from MS A 1008 or MS B 1020.

When both virtual queues are non-empty, Network Code Encoder 1016 encodes the packets from both queues, and delivers it to UL & DL switch 1014 for downlink multicast to both peers. In this way, network coding gain is realized, hence system performance is enhanced. When only one queue is non-empty, Network Code Encoder 1016 simply passes the packet from the non-empty queue to UL & DL switch. This is same as traditional scheduler without Network Code Encoder 1016. When both queues are empty, Network Code Encoder does nothing.

In order to fully achieve network coding gain, scheduling employs a policy called Lowest Queue Highest Priority (LQHP) algorithm for uplink. In this way, scheduler 1002 will give highest priority to the user with the shorter queue, thereby increasing network gain and system performance.

The embodiments of FIGS. 11-16 will now be described. These embodiments are particularly well suited for using MIMO based network coding in association with HARQ retransmissions.

Where a relay network does not provide for network coding at an intermediate station (e.g. a RS or a MS. For ease of understanding, RS is used to refer either RS or MS in later context.) HARQ retransmissions for different source stations (e.g. mobile stations) from an intermediate station to a serving station (e.g. a BS) will use different resources in the uplink direction. The embodiments described herein use MIMO based network coding to forward network coded HARQ information to a serving station. This can increase HARQ reliability and may also reduce resource consumption.

According to one aspect of HARQ retransmission, the following basic steps are provided:

(1) MSs transmit information to a relay station using the same (or different) radio resource (e.g., bandwidth, timeslot). This transmission is also partially received by the base station.

(2) RS receives the transmissions, applies MIMO based network coding of the received information, and transmits an encoded HARQ information signal in the uplink direction to the serving station (e.g. BS).

(3) BS receives the partial streams from source stations at (1) as well as receives the encoded HARQ information signal from the RS at (2). BS applies an iterative decoding, demodulation, and detection procedure to recover the original information from the MSs.

Figure 11:
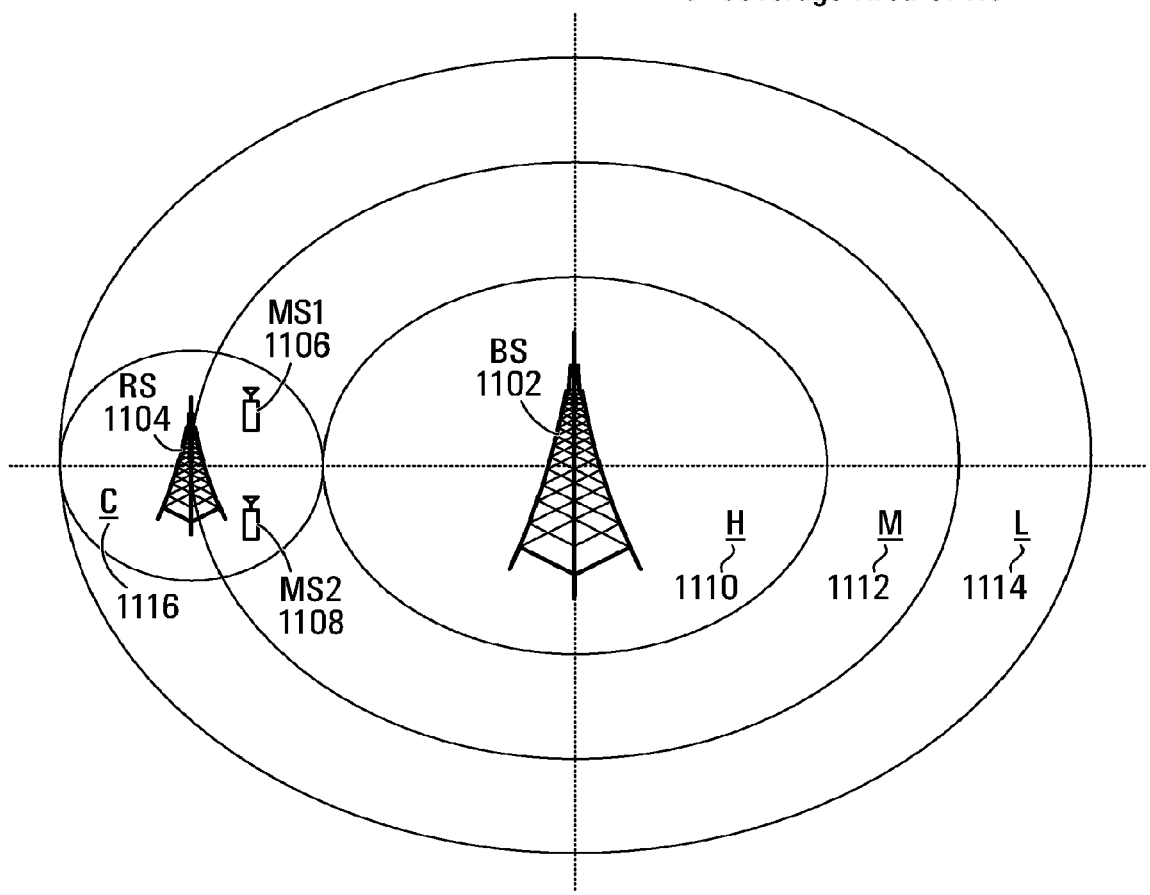
FIG. 11 is a diagram of a wireless communications environment according to one embodiment.

FIG. 11 is a diagram of a wireless communications environment according to one embodiment. Shown is a cellular wireless network including a base station (BS) 1102, a relay station (RS) 1104, and two mobile stations MS1 1106 and MS2 1108. BS 1102 is the serving station for MS1 1106 and MS2 1108. As serving station, BS 1102 is responsible for scheduling resources for uplink transmission and HARQ retransmission, and sending Acknowledgement (ACK)/Acknowledgement Negative (NACK) transmission as required.

FIG. 11 also shows a high geometry area of BS 1102 which is marked by "H" 1110. Also shown in a medium geometry area of BS 1102 which is marked by "M" 1112, and a low geometry area of BS 1102 which is marked by "L" 1114. Finally, the coverage area of RS 1104 is marked by "C" 1116. MS1 1106 and MS2 1108 are both located in medium geometry area 1112, and within the coverage area 1116 of RS 1104.

As is well known, MSs can be dispersed throughout the coverage area of a BS or a RS. A first MS which is closer to a BS (for example, in a high geometry area) than a second MS (for example, in a medium geometry area) will require relatively less power to communicate with the BS in the uplink and downlink directions.

Figure 12:
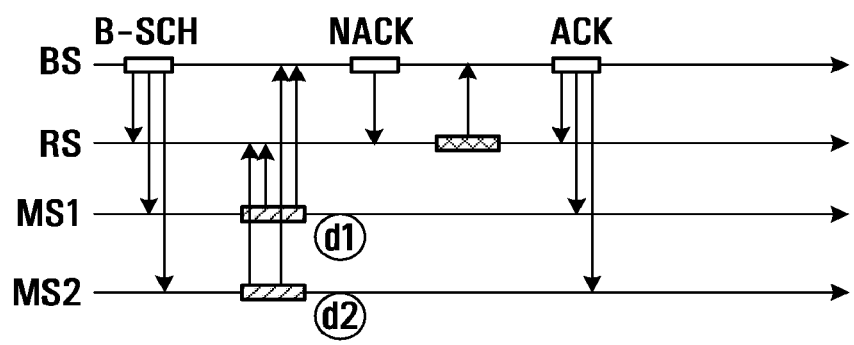
FIG. 12 is an example timing diagram for communications in accordance with the embodiment illustrated in FIG. 11.
Figure 13:
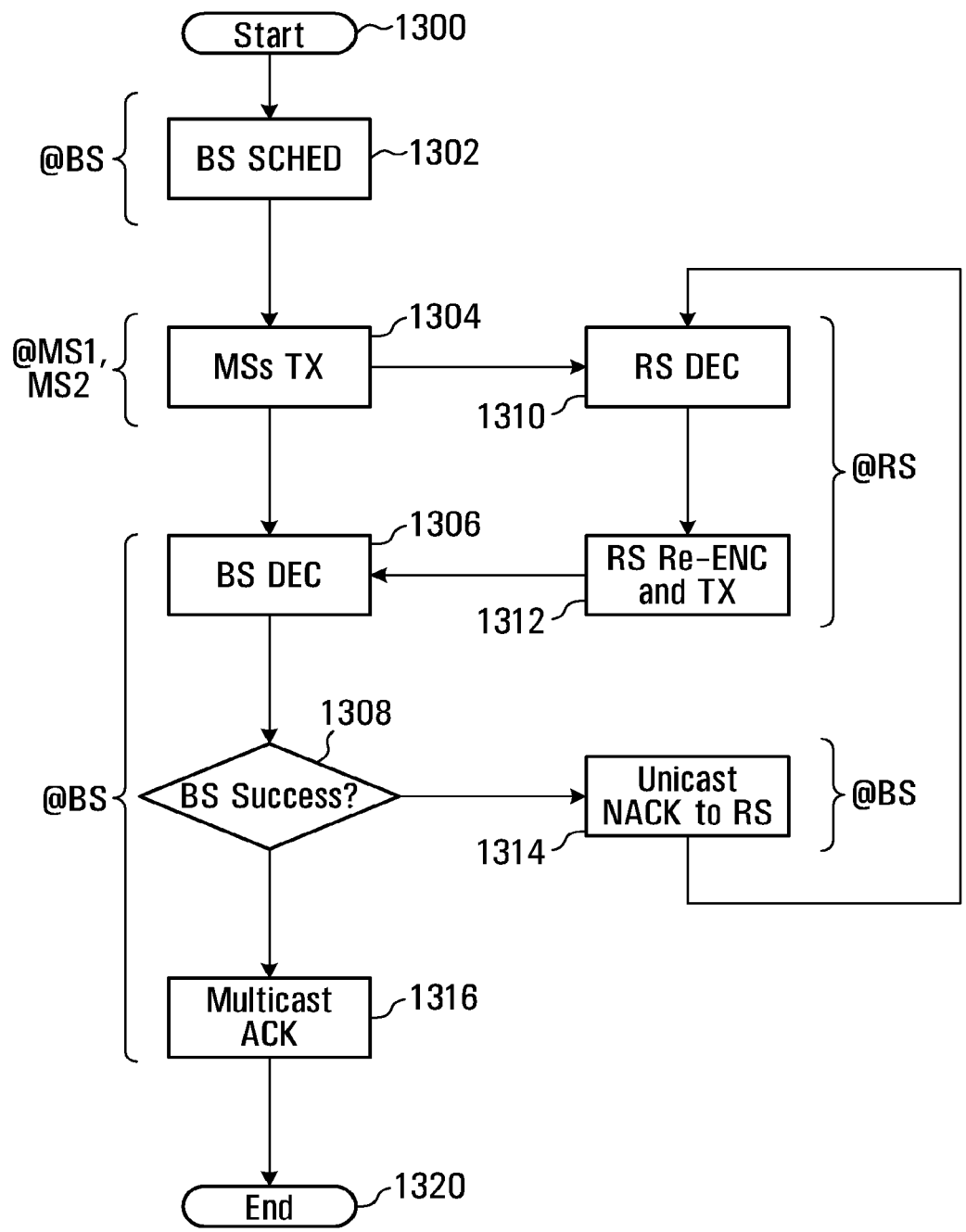
FIG. 13 is an example flowchart for the embodiment illustrated in FIGS. 11 and 12.

In this exemplary case, the synchronization and control signals of BS 1102 are able to reach the medium geometry area 1112. FIG. 12 is an example timing diagram for communications in accordance with the embodiment illustrated in FIG. 11. FIG. 13 is an example flowchart for the embodiment illustrated in FIGS. 11 and 12.

Turning now to FIGS. 11-13, at step 1302, BS 1102 performs scheduling by forwarding a BS control packet B-SCH to RS 1104, MS1 1106, and MS2 1108. At step 1304, both MS1 1106 and MS2 1108 multicast their packets d1, d2 to RS 1104 and BS 1102 (in this case via adaptive virtual MIMO) using the same/different resource unit.

At step 1306, BS 1102 tries to decode d1 and d2 received from MS1 1106 and MS2 1108 respectively. If there has been successful decoding following a determining of success at step 1308, BS 1102 multicasts at step 1316 an ACK packet to MS 1 1106, MS2 1108 and RS 1104. The process is ended at step 1320.

If there has not been successful decoding, BS 1102 unicasts a NACK packet to RS 1104 at step 1314. RS 1104 then at step 1310 demodulates and/or decodes d1 and d2 received from MS1 1106 and MS2 1108 respectively. At step 1312, RS 1104 then performs MIMO based network coding (using any one of the network coding schemes mentioned above), and then unicasts an encoded HARQ to BS 1102.

At step 1306, BS 1102 collects the received signals from step 1304 and step 1312, and conducts iterative network and channel decoding to obtain the original information d1, d2 originally transmitted from MS1 1106 and MS2 1108 respectively.

If there has been successful decoding following a determining of success at step 1308, BS 1102 multicasts at step 1316 an ACK packet to MS1 1106, MS2 1108 and RS 1104. Otherwise step 1314 is repeated. The process is ended at step 1320.

Figure 14:
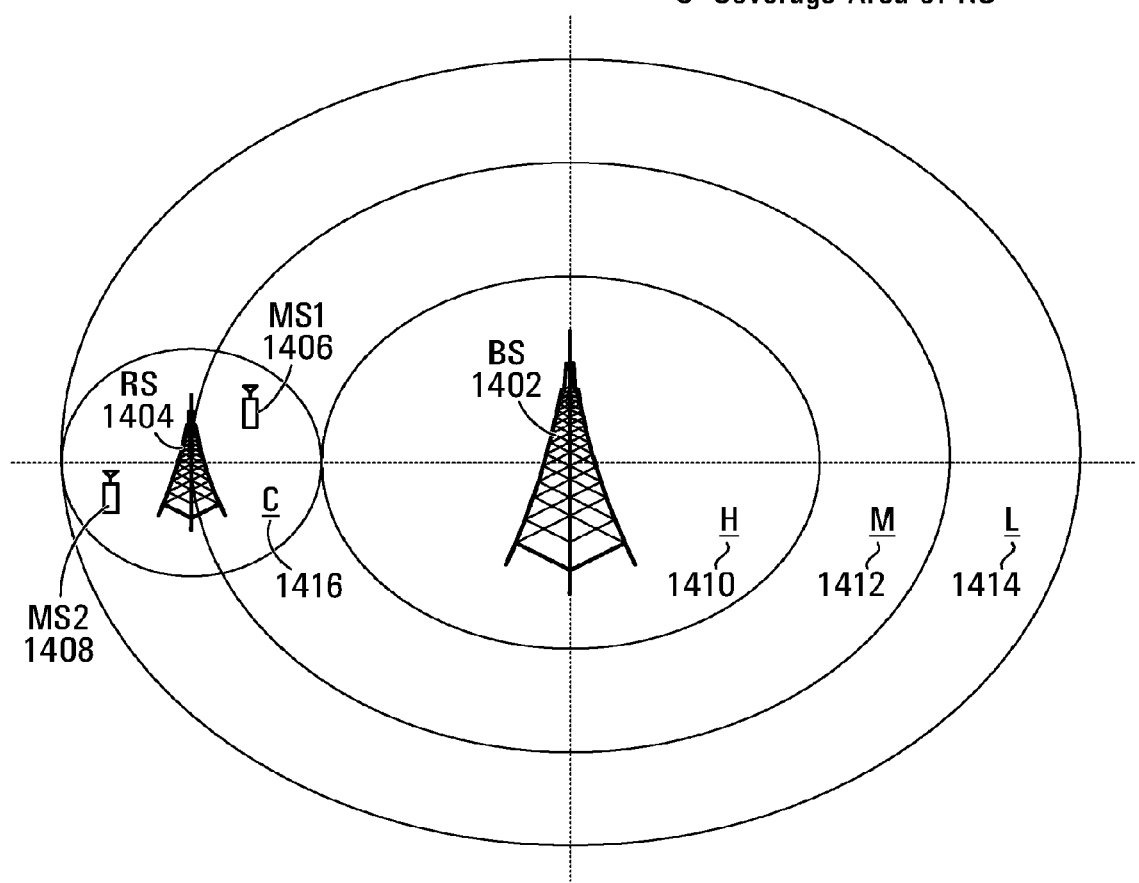
FIG. 14 is a diagram of a wireless communications environment according to one embodiment.

FIG. 14 is a diagram of a wireless communications environment according to one embodiment. Shown is a cellular wireless network including BS 1402, RS 1404, and two mobile stations MS1 1406 and MS2 1408.

FIG. 14 also shows a high geometry area of BS 1402 which is marked by "H" 1410. Also shown is a medium geometry area of BS 1402 which is marked by "M" 1412, and a low geometry area of BS 1402 which is marked by "L" 1414. Finally, the coverage area of RS 1404 is marked by "C" 1416. MS1 1406 is located in medium geometry area 1412, and MS2 1408 is located in low geometry area 1414. Both MS1 1406 and MS2 1408 are located within the coverage area 1416 of RS 1404.

If the synchronization and control signals of BS 1402 can cover the low geometry area 1414, BS 1402 becomes the serving station of MS1 1406 and MS2 1408. This is called transparent mode. Otherwise, RS 1404 needs to send the synchronization and control signals to MS2 1408. In this case, BS 1402 becomes the serving station of MS1 1406, and RS 1404 becomes the serving station of MS2 1408. This is called non-transparent mode. A serving station (BS 1402 or RS 1404 as the case may be) is responsible for scheduling resources for uplink transmission and HARQ retransmission, and sending ACK/NACK transmissions as required.

In this exemplary case, the synchronization and control signals of BS 1402 are able to reach the medium geometry area 1412 but not the low geometry area 1414.

Figure 15:
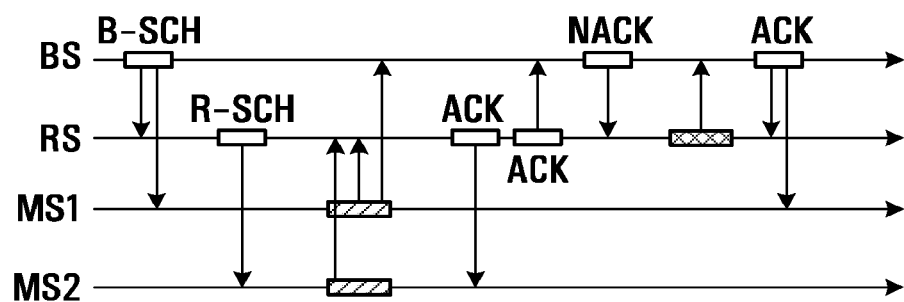
FIG. 15 is an example timing diagram for communications in accordance with the embodiment illustrated in FIG. 14.
Figure 16:
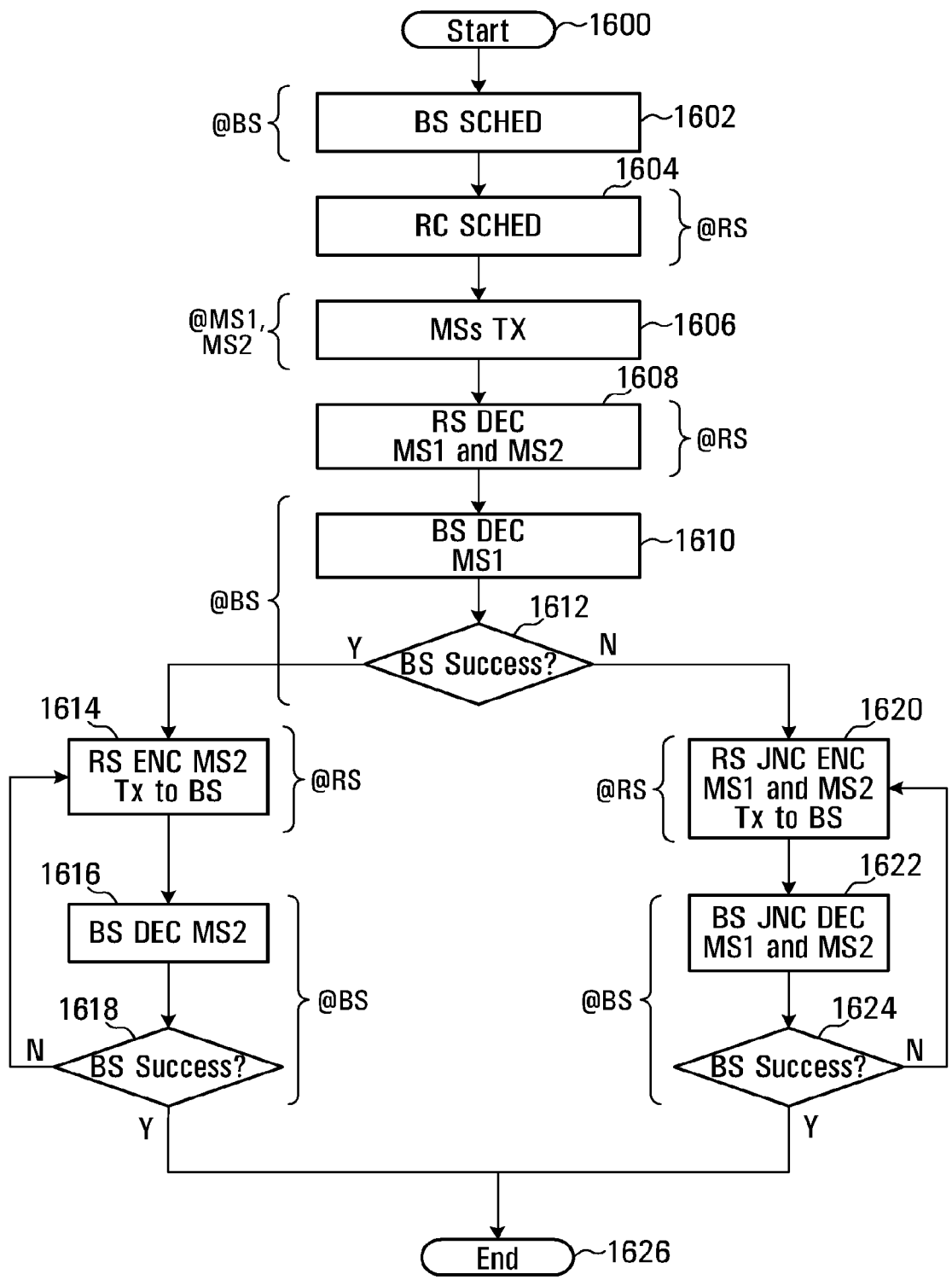
FIG. 16 is an example flowchart for the embodiment illustrated in FIGS. 14 and 15.

FIG. 15 is an example timing diagram for communications in accordance with the embodiment illustrated in FIG. 14. FIG. 16 is an example flowchart for the embodiment illustrated in FIGS. 14 and 15. The following discussion makes reference to each of FIGS. 14-16 in a corresponding manner.

At step 1602, BS 1402 performs scheduling by forwarding a BS control packet for resource scheduling B-SCH to RS 1404, and MS1 1406. At step 1604, RS 1404 performs scheduling by forwarding a RS control packet R-SCH for resource scheduling, or BS 1602 schedules MS2 1608 (in case of transparent mode, not expressly shown in the drawings).

At step 1606, MS1 1406 multicasts d1 to BS 1402 and RS 1404, while MS2 1408 unicasts d2 to RS 1404, using the same/different resource unit.

At step 1608, RS 1404 demodulates/decodes d1 and d2 received from MS1 1406 and MS2 1408 respectively. For the purpose of this description, it is assumed this step is always successful. RS 1404 then unicasts an ACK packet (in respect of d2, the information received from MS2 1408) to MS2 1408, and unicasts an ACK packet (in respect of d1, the information received from MS1 1406) to BS 1402.

At step 1610, BS 1402 tries to decode d1 received from MS1 1406. If decoding is not successful, BS 1402 unicasts a NACK packet to RS 1404 and at step 1620 RS 1404 performs MIMO based joint network and channel coding (JNCC) (using any of the network coding schemes identified above) of d1 and d2 (i.e. the information transmitted from MS1 1406 and MS2 1408 respectively) and then unicasts the encoded information (or called JNCC HARQ information) to BS 1402.

BS 1402 collects the signals from steps 1606 and 1620, and conducts an iterative network and channel decoding to obtain the original information d1 from MS1 1406 and d2 from MS2 1408.

If upon determination of successful decoding at step 1624, BS 1402 multicasts an ACK packet to MS1 1406 and RS 1404 and the process concludes at step 1626. Otherwise, BS 1402 unicasts a NACK packet to RS 1404, and the process returns to step 1620.

Returning again to step 1612, if upon determination of successful decoding at step 1612, BS 1402 multicasts an ACK packet to MS1 1406 and RS 1404. At step 1614 RS 1404 performs channel encoding on d2 (from MS2 1408), and then unicasts the information to BS 1402.

BS 1402 receives the information and conducts a channel decoding to obtain the original information d2 from MS2 1408. If upon determination of successful decoding at step 1618, BS 1402 multicasts an ACK packet to RS 1404, the process concludes at step 1626. Otherwise, BS 1402 unicasts a NACK packet to RS 1404, and the process returns to step 1614.

Figure 17:
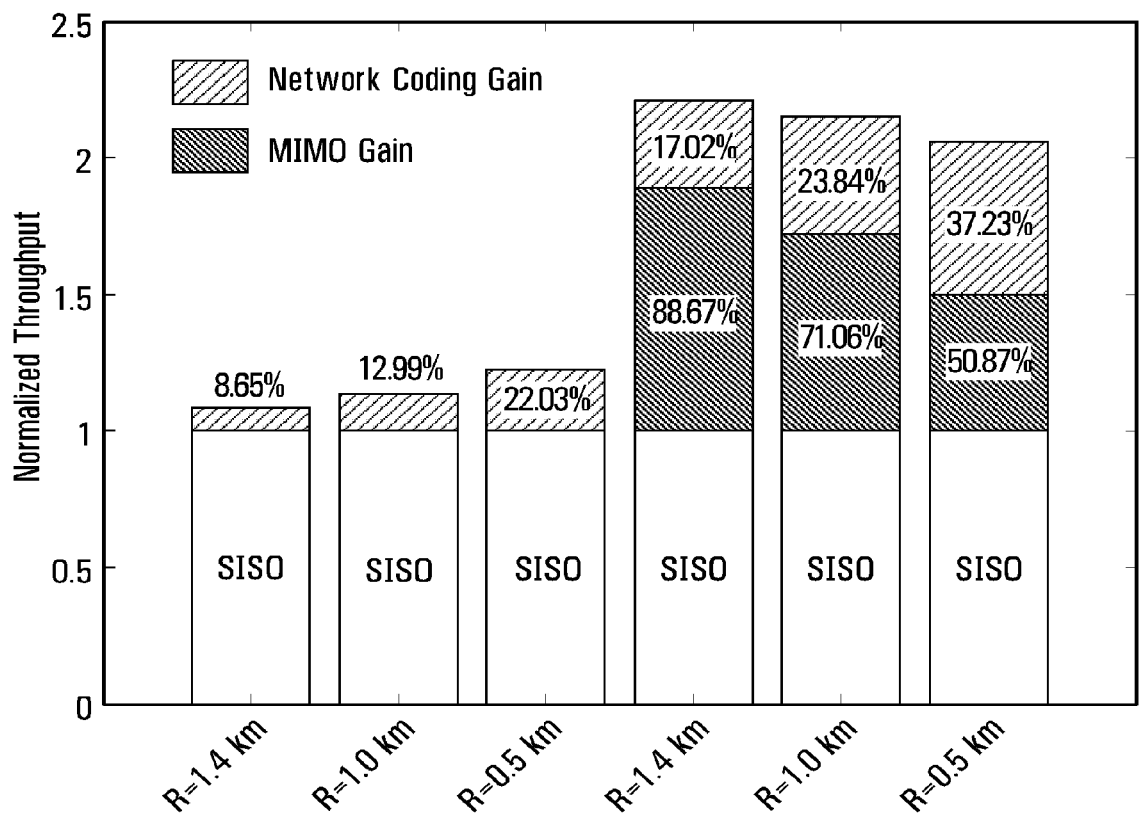
FIG. 17 is an example graph indicating network gains realized by MIMO based network coding.

FIG. 17 is an example graph indicating network gains realized by MIMO based network coding. Along the horizontal axis is an indication of radius of coverage of a BS (in this case, either 1.4 km, 1.0 km, or 0.5 km). Along the vertical axis is the normalized throughput.

The normalized throughput of six SISO systems is shown to be equal to 1 for comparison purposes.

In a first example system where the radius of coverage of the BS was 1.4 km, there was achieved a 8.65% gain through the use of DF network coding. In the second system, where the radius of coverage of the BS was 1 km, DF network coding achieved a 12.99% gain. In the third system, where the radius of coverage of the BS was 0.5 km, DF network coding achieved a 22.03% gain.

The setup used to test the gain achieved by MIMO based network coding was as follows. A BS was used with two antennas, and two MSs were used each with one antenna. Virtual MIMO was used for uplink, Space-Time Transmit Diversity (STTD) for Network Coded multicast downlink. A DF network coding scheme was employed. Equal throughput was scheduled for uplink and downlink per frame, and single cell, two MSs per drop, 1,000 realizations were used.

It was observed using the above setup that where the radius of coverage of the BS is 1.4 km, MIMO gain was 88.67% and network coding gain was 17.02%. Where the radius of coverage of the BS is 1 km, MIMO gain was 71.06% and network coding gain was 23.94%. Where the radius of coverage of the BS is 0.5 km, MIMO gain was 50.87% and network coding gain was 37.23%.

Thus, the compound gain of MIMO based network coding was observed to be greater than 85%. It was also observed that in this embodiment, MIMO enhances pure network coding gain.

What has been described is merely illustrative of the application of the principles of the invention. Other arrangements and methods can be implemented by those skilled in the art without departing from the spirit and scope of the present invention.

The invention claimed is:

1. A method for implementing Multiple Input Multiple Output (MIMO) based network coding at an intermediate node in a wireless communication system, the wireless communication system including an intermediate node, a first node and a second node, the intermediate node including a plurality of antennas, comprising:
   receiving, by the intermediate node, first data from the first node;
   receiving, by the intermediate node, second data from the second node;
   storing the first data in a first queue and storing the second data in a second queue;
   performing network coding on at least a portion of the first data from the first queue and at least a portion of the second data from the second queue using a network coding scheme to produce network coded information;
   transmitting, by the intermediate node, the network coded information to the first node and second node using multi-user MIMO;
   scheduling transmissions of packets from the first node and second node to the intermediate node, wherein a higher priority for said scheduling is given to the first node or the second node based on whichever one of the first queue and the second queue has a shorter queue length.

2. The method of claim 1, wherein the MIMO transmission is a spatial multiplex transmission.

3. The method of claim 1, wherein the first data and the second data received at the intermediate node are transmitted to the intermediate node using one or more of spatial multiplexing, time division multiplexing, or frequency division multiplexing.

4. The method of claim 1, wherein the first node belongs to a group of nodes all within a same coverage area.

5. The method of claim 1, wherein the second node belongs to a group of nodes all within a same coverage area.

6. The method of claim 1, wherein network coding is implemented at the intermediate node by an exclusive OR (XOR) operation on the first data with the second data.

7. The method of claim 1, wherein the network coding scheme employed at the intermediate node is Decode and Forward (DF).

8. The method of claim 1, wherein the intermediate node is one of a Relay Station (RS), Mobile Station (MS), and Base Station (BS).

9. An intermediate node in a wireless communication system implementing Multiple Input, Multiple Output (MIMO) based network coding, the wireless communication system including the intermediate node, a first node and a second node, the intermediate node comprising:
   a receiver configured to receive first data from the first node and receive second data from the second node, the first data having a first data length and the second data having a second data length, wherein the receiver is configured to store the first data in a first queue and store the second data in a second queue;
   an encoder configured to perform MIMO-based network coding on at least a portion of the first data from the first queue and at least a portion of the second data from the second queue using a network coding scheme to produce network coded information; and
   a scheduler configured to schedule transmissions of packets from the first node and the second node to the intermediate node wherein the scheduler is configured to assign a higher priority for scheduling to the first node or the second node based on whichever one of the first queue and the second queue has a shorter queue length.

10. The intermediate node of claim 9, wherein the network coded information includes a Hybrid Automatic Repeat Request (HARQ) message.

11. A transceiver in a wireless communications network for implementing Multiple Input, Multiple Output (MIMO) based network coding, the transceiver comprising:
   a plurality of antennas;
   a receiver configured to receive, via the antennas, first data from a first node and second data from a second node;
   a first queue configured to store the first data
   a second queue configured to store the second data;
   circuitry configured to perform network coding on at least a portion of the first data from the first queue and at least a portion of the second data from the second queue using a network coding scheme to produce network coded information; and
   a transmitter configured to transmit, via the antennas, the network coded information to the first node and second node using multi-user MIMO;
   a scheduler configured to schedule transmissions of packets from the first node and the second node to the transceiver, wherein the scheduler is configured to assign a higher priority for scheduling to the first node or the second node based on whichever one of the first queue and the second queue has a shorter queue length.

12. The transceiver of claim 11, wherein the multi-user MIMO transmission is a spatial multiplex transmission.

13. The transceiver of claim 11, wherein the first node transmits the first data to the transceiver, and the second node transmits the second data to the transceiver using one or more of spatial multiplexing, time division multiplexing, or frequency division multiplexing.

14. The transceiver of claim 11, wherein said network coding is implemented by exclusive OR (XOR) operating the first data with the second data.

15. The transceiver of claim 11, wherein the network coding scheme is Decode and Forward (DF).

16. The transceiver of claim 11, wherein the transceiver is a base station (BS).

17. The transceiver of claim 11, wherein the network coded information includes a Hybrid Automatic Repeat Request (HARQ) message.

18. A coding node in a wireless communications system implementing Multiple Input, Multiple Output (MIMO) based network coding, the coding node comprising:
   a plurality of antennas;
   an input configured to receive first data from a first node and second data from a second node;
   a first queue configured to store the first data;
   a second queue configured to store the second data;
   circuitry configured to perform network coding on at least a portion of the first data from the first queue and at least a portion of the second data from the second queue using a network coding scheme to produce network coded information; and
   an output configured to transmit the network coded information to the first node and second node using multi-user MIMO;
   a scheduler configured to schedule transmissions of packets from the first node and the second node to the coding node, wherein the scheduler is configured to assign a higher priority for scheduling to the first node or the second node based on whichever one of the first queue and the second queue has a shorter queue length.

19. The coding node of claim 18, wherein the coding node is a base station.

20. The intermediate node of claim 9, wherein the intermediate node is a base station.

* * * * *